United States Patent [19]
Wilkerson

[11] Patent Number: 5,158,650
[45] Date of Patent: * Oct. 27, 1992

[54] SOLAR STILL ASSEMBLY

[76] Inventor: William M. Wilkerson, 4214 University Dr., Charlotte, N.C. 28209

[*] Notice: The portion of the term of this patent subsequent to Oct. 30, 2007 has been disclaimed.

[21] Appl. No.: 495,369

[22] Filed: Mar. 19, 1990

Related U.S. Application Data

[63] Continuation of Ser. No. 229,778, Aug. 5, 1988, Pat. No. 4,966,655, which is a continuation of Ser. No. 355, Jan. 5, 1987, abandoned.

[51] Int. Cl.$^5$ ............................................. B01D 3/00
[52] U.S. Cl. ................................... 202/234; 126/415; 126/450; 159/903; 202/267.1; 203/10; 203/86; 203/DIG. 17; 203/DIG. 1
[58] Field of Search .......... 203/10, DIG. 1, DIG. 17, 203/86; 202/234, 267.1, 181; 159/903; 126/415, 450

[56] References Cited

U.S. PATENT DOCUMENTS

| | | | |
|---|---|---|---|
| 983,424 | 2/1911 | Brosius | 159/903 |
| 1,812,516 | 6/1931 | Dooley | 202/234 |
| 2,848,389 | 8/1958 | Bjorksten | 203/DIG. 17 |
| 2,877,164 | 3/1959 | Meyer | 159/903 |
| 3,006,818 | 10/1961 | Lappala et al. | 202/234 |
| 3,104,210 | 9/1963 | Mount | 202/234 |
| 3,408,260 | 10/1968 | Feldman et al. | 202/234 |
| 3,549,503 | 12/1970 | Hay | 202/234 |
| 3,653,150 | 4/1972 | Howard | 202/234 |
| 3,655,517 | 4/1972 | Hensley, Jr. et al. | 203/DIG. 1 |
| 4,010,080 | 3/1977 | Tsay et al. | 202/234 |
| 4,137,901 | 2/1979 | Maier | 203/DIG. 1 |
| 4,227,970 | 10/1980 | Howell, Jr. et al. | 202/234 |
| 4,235,679 | 11/1980 | Swaidan | 202/234 |
| 4,345,974 | 8/1982 | McCarthy | 202/234 |
| 4,440,861 | 4/1984 | McCarthy | 159/903 |
| 4,606,794 | 8/1986 | Wyckoff | 159/903 |

FOREIGN PATENT DOCUMENTS

| | | | |
|---|---|---|---|
| 0601113 | 6/1978 | Switzerland | 202/234 |
| 0594131 | 11/1947 | United Kingdom | 159/903 |
| 0743539 | 1/1956 | United Kingdom | 159/903 |
| 1166840 | 10/1969 | United Kingdom | |
| 2066681 | 7/1981 | United Kingdom | 202/234 |

OTHER PUBLICATIONS

Hay, "New Concepts in Solar Still Design", First International Symposium on Water Desalination, Oct. 3-9, 1965.
Bloemer et al "Solar Distillation" Oct. 3-9, 1965, Washington, D.C. Symposium pp. 1-14.

*Primary Examiner*—Virginia Manoharan
*Attorney, Agent, or Firm*—Michael V. Drew

[57] ABSTRACT

A solar still assembly has a thermally-insulated pan which supports an open frame of elongated members. The pan has side walls which support the frame members, with one side wall being higher than the other side wall. One end of each frame member is attached to the top edge of the higher side wall while the additional support for each frame member is provided by the lower side wall. The frame members incline downwardly toward the lower side wall. There are several embodiments which teach alternative frame members for providing the additional support by the lower side wall as well as the manner in which a trough is formed from the frame members or is attached to the pan. In all embodiments, a thin-film, flexible, solar-energy transmissive sheet overlies the frame, permitting solar energy to enter the still and evaporate liquid in the pan. Condensate forms on the inner surface of the solar sheet and flows down the inclined surface into the trough.

14 Claims, 3 Drawing Sheets

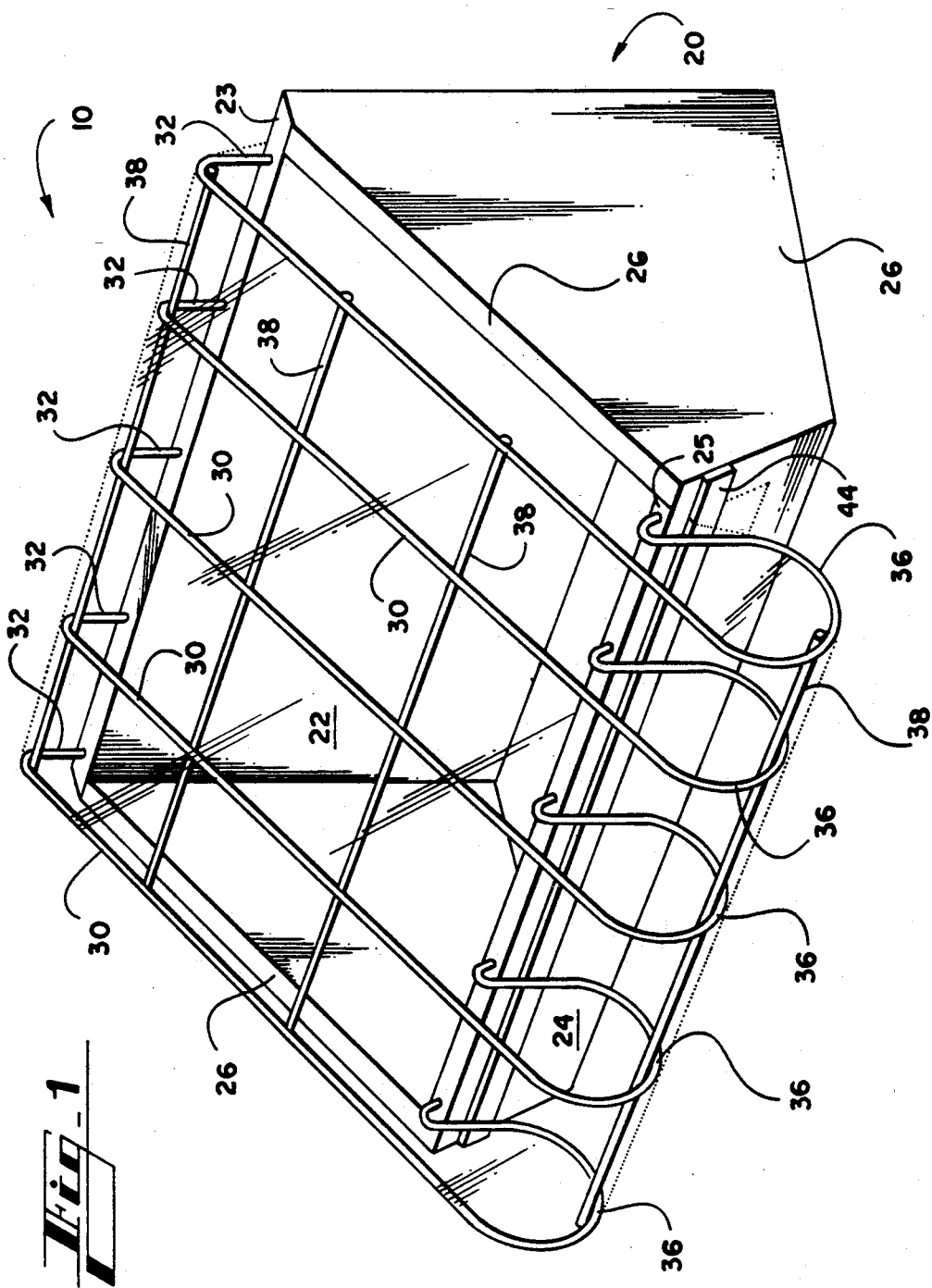
Fig_1

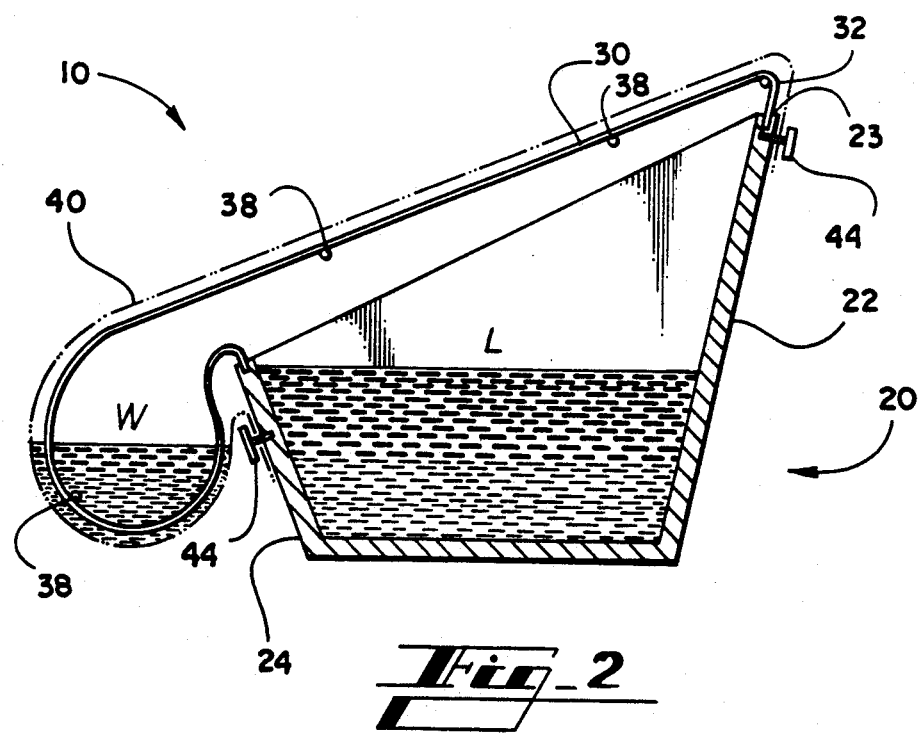
Fig_2
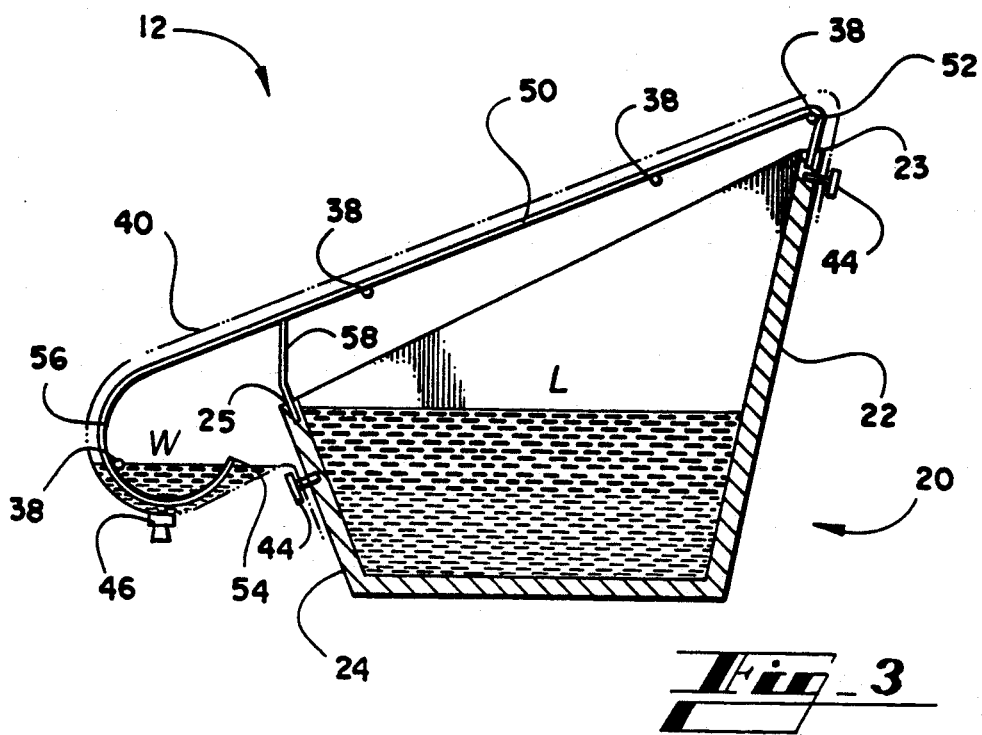
Fig_3

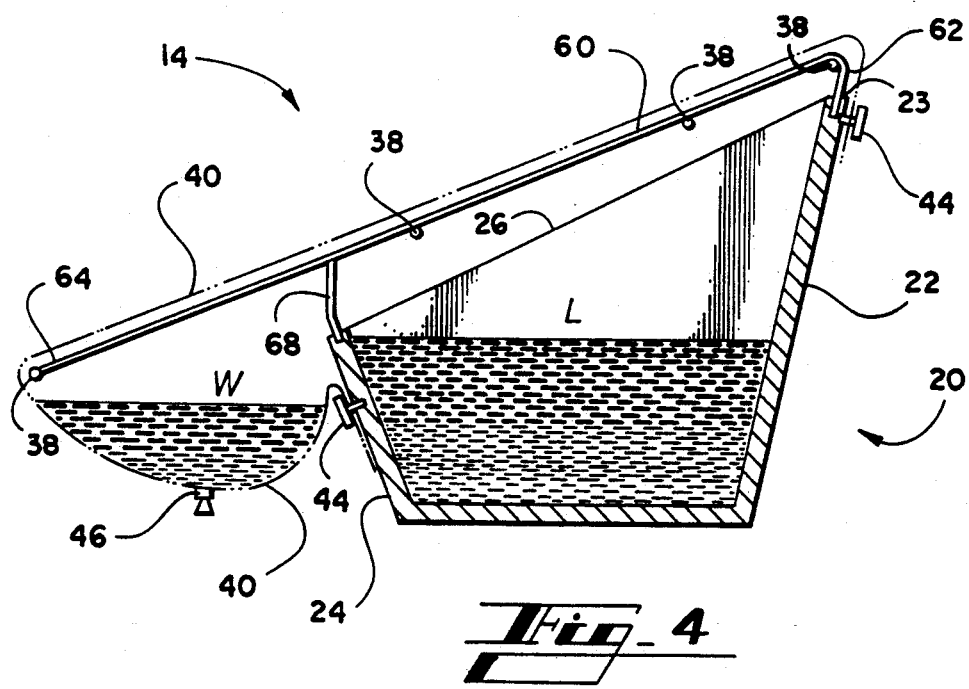
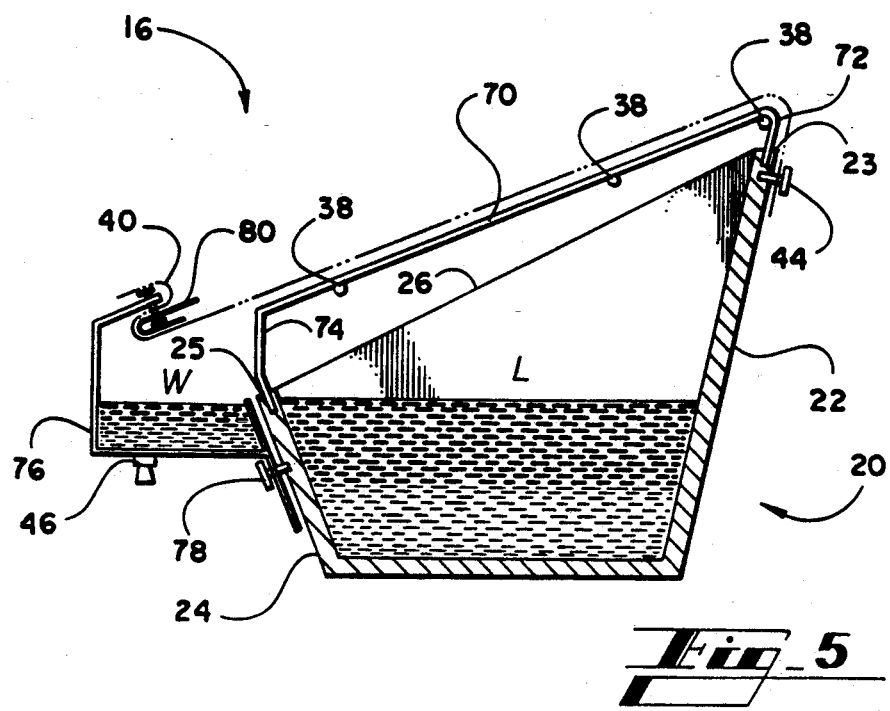

SOLAR STILL ASSEMBLY

RELATED APPLICATIONS

This is a continuation of U.S. patent application Ser. No. 07/229,778 Aug. 5, 1988, which is a continuation of U.S. patent application Ser. No. 07/000,355 filed Jan. 5, 1987, abandoned application Ser. No. 07/229,778 was issued as U.S. Pat. No. 4,966,655.

TECHNICAL FIELD OF THE INVENTION

This invention relates to solar stills and, more particularly, to solar stills formed of readily-available, low-cost components and in which the components may form a compact kit prior to assembly.

BACKGROUND OF THE INVENTION

It is well-known that solar stills are valuable in distilling drinkable water from salt water or other undrinkable water, particularly sea water. My earlier U.S. Pat. No. 4,966,655, which is referenced above, discloses a low-cost, simplified still which uses a thin-film, flexible sheet fitted over a wire frame. While U.S. Pat. No. 4,966,655 discloses several variations of the invention, other low-cost variations are possible.

SUMMARY OF THE INVENTION

It is an object of the present invention to provide variations of a relatively simple, low-cost solar still which performs adequately and which can be easily stored.

According to a broad aspect of the invention, a thermally-insulated pan supports an open frame which frame consists of elongated frame members. The pan has side walls which support the frame members. One side wall is higher than the other. One end of each frame member is attached to the top edge of the higher side wall. The additional support for each frame member is provided by the lower side wall. The frame members attach so that they incline downwardly toward the lower side wall. In several embodiments of the invention, the frame members have a substantially J-shaped configuration wherein a curved portion of each frame member which creates the J-shaped appearance forms the framework for a trough. In another embodiment, the frame members have a substantially straight configuration and the area defined by the overhang of the lower portion of the straight elongated member with respect to the lower side wall of the pan defines the trough area. In yet another embodiment of the invention, a trough is formed outside of the pan separate and distinct from the frame members. In all of the embodiments, a thin-film, flexible, solar-energy transmissive sheet overlies the frame. This solar sheet permits solar energy to enter the still and evaporate liquid in the pan. Condensate from the evaporated liquid forms on the inner surface of the solar sheet and then flows down the inclined surface because of gravity. In the embodiment employing J-shaped frame members, the condensate flows into a trough formed from the sheet overlying the curved portion of the frame members. In a straight-frame-member embodiment, a trough is formed by wrapping the sheet around a longitudinal stringer which connects the ends of frame members. In the embodiment wherein the trough is separately formed, the inclined surface of the sheet terminates at the trough, allowing condensate flowing down the inclined inner surface to flow into the trough.

Other aspects, objects, features, and advantages of the present invention will become apparent to those skilled in the art upon reading the detailed description of preferred embodiments in conjunction with the accompanying drawings and appended claims.

BRIEF DESCRIPTION OF THE DRAWINGS

FIG. 1 is an isometric view of a solar still assembly embodying the teachings of the present invention (Embodiment A).

FIG. 2 is a sectional view of the invention of FIG. 1.

FIG. 3 is a sectional view of another embodiment (Embodiment B) of a solar still incorporating the teachings of the present invention.

FIG. 4 is a sectional view of another embodiment (Embodiment C) of a solar still incorporating the teachings of the present invention.

FIG. 5 is a sectional view of another embodiment (Embodiment D) of a solar still incorporating the teachings of the present invention.

DETAILED DESCRIPTION OF THE INVENTION

In the detailed description which follows, the same numerals are used for like elements throughout the description and drawings.

FIG. 1 shows an isometric view of a solar still 10 incorporating the teachings of the present invention. All of the embodiments described below have substantially the same structure but differ in the configuration of the frame members. The solar still 10 may be referred to as embodiment A. Again referring to FIG. 1, a pan 20 serves the dual purpose of holding a liquid L to be distilled and providing a support base for the frame. The pan 20 has a first side wall 22 and a second side wall 24. The first side wall 22 is higher than the second side wall 24. Each side wall has a top edge, 23 and 25, respectively. End walls 26 are disposed at either end of the pan 20. It is preferable that the pan 20 be thermally insulated so that the heat, produced by solar energy, which warms the liquid L to be distilled does not unnecessarily escape through the walls of the pan 20. The more heat that is retained by the liquid, the better the evaporation rate for the liquid L. J-shaped elongated frame members 30 form the principal parts of a frame. Each J-shaped frame member has a first end 32 and a second end 34. Adjacent the second end 34 is a curved portion 36 that gives the J-shaped member 30 its J-shaped appearance. Each J-shaped frame member 30 is attached to the pan 20. The first end 32 of the frame member 30 is attached at or near the top edge 23 of the first (higher) side wall 22. The second end 34 of the frame member 30 is attached at or near the top edge 25 of the second (lower) side wall 24. Although any standard method of attachment would be suitable, if a foam pan is used, the ends 32 and 34 may be embedded in the top edges 23 and 25, respectively, as shown. Parallel alignment of the frame members 30 provides a frame for receiving a thin-film, flexible, solar-transmissive sheet (solar sheet 40). Stringers 38 connecting frame members 30 may be used to provide additional strength for the framework. The strip fastener 44 which is shown attached to the pan 20 is used to secure an edge of the solar sheet 40 (not shown) in this view) to the pan 20.

Referring now to FIG. 2, a cross section of the solar still assembly 10 is shown. The alignment of the aforementioned elements is further illustrated together with the placement of the solar sheet 40 upon the framework. When the solar sheet 40 is stretched over the frame, it provides a window through which solar energy may heat the liquid L in the pan 20 while the under side of sheet 40 provides a surface for collecting condensate as the liquid L evaporates. Simple fasteners, such as a strip fastener 44 with thumb-tack like protrusions, may be used to secure the solar sheet 40 to the pan 20, particularly if the pan 20 is made of easily penetrable foam. When the solar sheet 40 is placed around the curved portion 36 of the frame members 30, a trough is formed. Sringers 38 may be used to help maintain alignment of the frame members 30 and prevent sagging of the solar sheet 40. The stringers 38 must be connected to the frame members 30 opposite the side of the frame members 30 which supports the solar sheet 40 so that the free flow of condensate will not be impaired. Each frame member 30 is downwardly inclined from the higher side wall 22 toward the lower side wall 24. The solar sheet 40, when placed over the downwardly-inclined frame, likewise provides a downwardly inclined condensate collection surface. As condensate collects on the underside of the solar film 40, gravity pulls the condensate downward along the inclined surface. The condensate then flows into the trough which is integrally formed with the downwardly-inclined collection surface. A stringer 38 may be helpful if placed along the curved portion 36 of the frame members 30 to reinforce the trough formed from the solar sheet 40. Simple outlets 46 may be placed along the bottom of the trough as a means for removing distillate W, or distilled water, from the trough.

Referring now to FIG. 3, a variation of the frame as taught by the present invention is illustrated. This solar still assembly 12, referred to as embodiment B, differs from embodiment A in that although substantially J-shaped elongated frame members 50 are used, the second end 54 of each frame member 50 does not serve as a connecting point to the pan 20. The frame member 50 does have a curved portion 56 and terminates in a second end 54. However, the lower portion of the frame member 50 is connected to the second (lower) side wall 24 by means of an auxiliary support member 58. The auxiliary support member 58 is shown as being generally vertically disposed with one end embedded in the top edge 25 of the second side wall 24 and its other end supporting the frame member 50 through attachment at a point along the frame member's 50 length. This method of attachment provides a downwardly-inclined frame and condensate surface, and allows the solar film 40 to be wrapped around the curved portions 56 of the frame members 50 to form a trough for collecting condensate and holding the distillate W.

Referring now to FIG. 4, therein is shown a solar still assembly 14, referred to as embodiment C, which employs substantially straight elongated frame members 60. Frame members 60 have an auxiliary support member 68 which functions in the same manner as the auxiliary support member 58 for frame members 50. The trough for embodiment C is formed by wrapping the solar sheet 40 around the lower portion of the frame members 60. In this embodiment C, there is not a curved portion of each frame member which helps to forma trough. Instead, a stringer 38 is placed along the ends 64 of the frame members 60, respectively, and serves as the interface between the downwardly-inclined condensate-collection surface and a trough. The stringer 38 allows the solar sheet 40 to be wrapped around the ends of the frame member 60 without being punctured. The overhand of the bottom portion of the frame members 60 helps define a trough to be formed when the solar sheet 40 is secured to the second (lower) side wall 24.

Referring now to FIG. 5, therein is shown a solar still assembly 16, referred to as embodiment D, which employs a separate and distinct trough 76 rather than a trough which is integrally formed as a part of the solar sheet 40 and frame members. In embodiment D, the second ends 74 of substantially straight elongated frame members 70 are attached to the second (lower) side wall 24 of the pan 20. The second end 74 is shown embedded in the top edge 25 of the second side wall 24. The trough 76 is attached to the second side wall 24 in a position which allows the downwardly-inclined surface of the solar sheet 40 to terminate into the trough 76. The trough 76 may be secured to the second side wall 24 by any convenient means including a simple fastener 78 as shown. The solar sheet 40 may be attached to the trough by any standard means, such as the fastening member 80 which is shown. The fastening member 80 which is shown has a U-shape and extends along the length of the trough 76. The fastening member 80 seals and secures the solar sheet 40 to the trough 76 similar to manner in which strip fastener 44 of FIGS. 1 through 4 seals and secures the solar sheet 40 to the pan 20.

In all embodiments of the invention, the solar sheet 40 is not only secured to the side walls, but also contacts the end walls 26 to fully enclose the pan 20. A fully enclosed pan 20 promotes optimal evaporation and condensation. Most of the elements of the solar still assembly are the same in embodiments A, B, C, and D. Only the trough, the manner in which the trough is formed and the manner in which the lower portion of each frame member is supported vary from embodiment A.

The frame members 30, 50, 60, and 70 may be made from any material which can be easily formed into the required shape. Examples of suitable material are plastic, plastic tubing, metal tubing, and wire. In addition, combinations of materials such as plastic covered wire, would also be suitable. Plastic covered wire would provide the additional advantage of alleviating stress upon the solar sheet 40 which would be caused at certain points by a wire frame.

As should be apparent from the foregoing specification, the invention is susceptible of being modified with various alterations and modifications which may differ from those which have been described in the preceding specification and description. Accordingly, the following claims are intended to cover all alterations and modifications which do not depart from the spirit and scope of the invention.

What is claimed is:

1. A solar still comprising:
   at least one elongated upwardly open thermally-insulated pan for holding a liquid to be distilled, said pan having first and second elongated side walls each having a top edge with said first side wall being higher than said second side wall;
   an open frame comprised of a plurality of elongated frame members each having a substantially J-shaped configuration, disposed in spaced-apart parallel vertical planes, respectively, each said elongated frame member having first and second ends, a substantially straight portion adjacent said first end and a substantially U-shaped portion adjacent said second end;

means for securing said first end of each said elongated frame member to said first side wall adjacent the top edge thereof with said straight portion inclined downwardly towards said second side wall, additional means for securing each said frame member to said second side wall adjacent the top edge thereof with said substantially U-shaped portion extending adjacent the top edge of said second wall outside of said pan;

at least one longitudinal stringer member extending along said elongated frame members; and a thin-film, flexible, solar-energy transmissive sheet having side edges overlying said frame and means for securing said side edges of said sheet to said side walls adjacent said top edges thereof and for maintaining said sheet in engagement with said frame to define a downwardly-inclined surface overlying said pan upon which evaporated liquid will condense, said thin-film, flexible, solar-energy transmissive sheet extending around said substantially U-shaped portions of said elongated frame members of said open frame forming a trough for collecting condensation flowing down said inclined surface.

2. A solar still as set forth in claim 1, wherein said additional means for securing each said frame member comprises means for securing said second end of each said elongated frame member to said second side wall adjacent the top edge thereof with said U-shaped portion extending adjacent the top edge of said second side wall outside of said pan.

3. A solar still as set forth in claim 1, wherein said additional means for securing each said frame member comprises an auxiliary member having a first end and a second end, with said first end of said auxiliary member attached to said elongated frame member proximate said U-shaped portion of said elongated frame member and distal said second end of said elongated frame member, and with said second end of said auxiliary member secured to said second side wall.

4. A solar still as set forth in claim 1, wherein said elongated frame members comprise plastic.

5. A solar still as set forth in claim 1, wherein said elongated frame members comprise wire.

6. A solar still as set forth in claim 1, wherein said elongated frame members comprise plastic tubing.

7. A solar still as set forth in claim 1, wherein said elongated frame members comprise metal tubing.

8. A solar still as set forth in claim 2, wherein said pan is comprised of a foam plastic material with said first and second ends of each elongated frame member imbedded in the top edges of said first and second side walls, respectively.

9. A solar still comprising:

at least one elongated upwardly open thermally-insulated pan for holding a liquid to be distilled, said pan having first and second elongated side walls each having a top edge with said first side wall being higher than said second side wall;

an open frame comprised of a plurality of elongated frame members each having a substantially straight configuration, disposed in spaced-apart parallel vertical planes, respectively, each said elongated frame member having first and second ends;

first means for securing said first end of each elongated frame member to said first side wall adjacent the top edge thereof with said straight portion inclined downwardly towards said second side wall;

second means for securing each said elongated frame member to said second side wall adjacent the top edge thereof with said second end of each said elongated frame member extending outside of said pan below said top edge of said second side wall;

a longitudinally extending stringer member extending along said second ends of said elongated frame members; and a thin-film, flexible, solar-energy transmissive sheet having side edges overlying said frame and means for securing said side edges of said sheet to said side walls adjacent said top edges thereof and for maintaining said sheet in engagement with said frame to define a downwardly inclined surface overlying said pan upon which evaporated liquid will condense, said thin-film, flexible, solar-energy transmissive sheet extending around and under said second ends of said elongated frame members and said stringer member forming a trough for collecting condensation flowing down said inclined surface.

10. A solar still as set forth in claim 9, wherein "said second means" for securing each said "elongated" frame member comprises an auxiliary member having a first end and a second end, with said first end of said auxiliary member attached to said elongated frame member proximate said second end of said elongated frame member, and with said second end of said auxiliary member secured to said second side wall.

11. A solar still as set forth in claim 9, wherein said elongated frame members comprise plastic.

12. A solar still as set forth in claim 9, wherein said elongated frame members comprise wire.

13. A solar still as set forth in claim 9, wherein said elongated frame members comprise plastic tubing.

14. A solar still as set forth in claim 9, wherein said elongated frame members comprise metal tubing.

* * * * *